(No Model.)　　　　　　　W. H. BECKWITH.　　　　　3 Sheets—Sheet 2.
HAY RAKE AND LOADER.
No. 551,750.　　　　　　　　　　　　Patented Dec. 24, 1895.
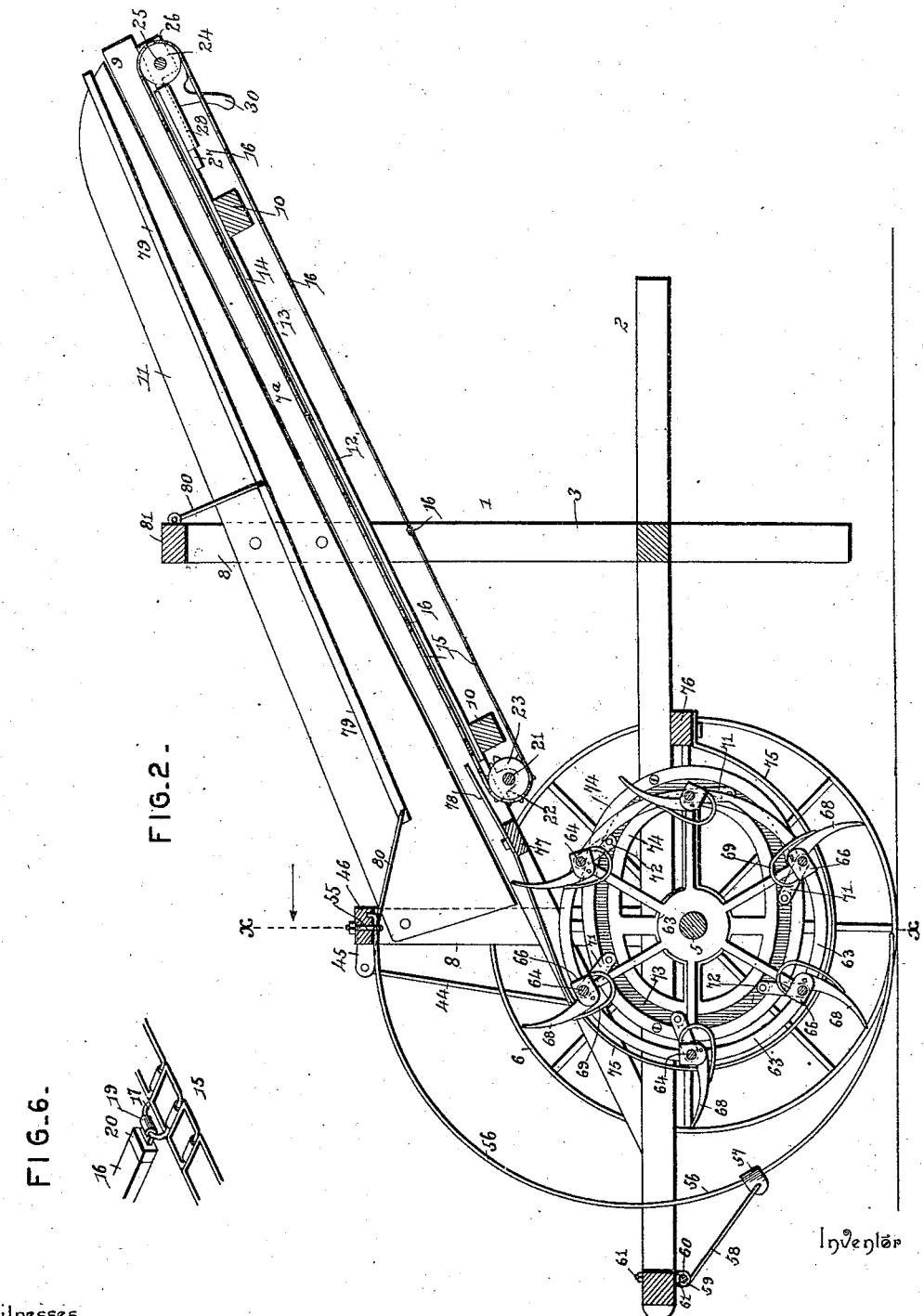

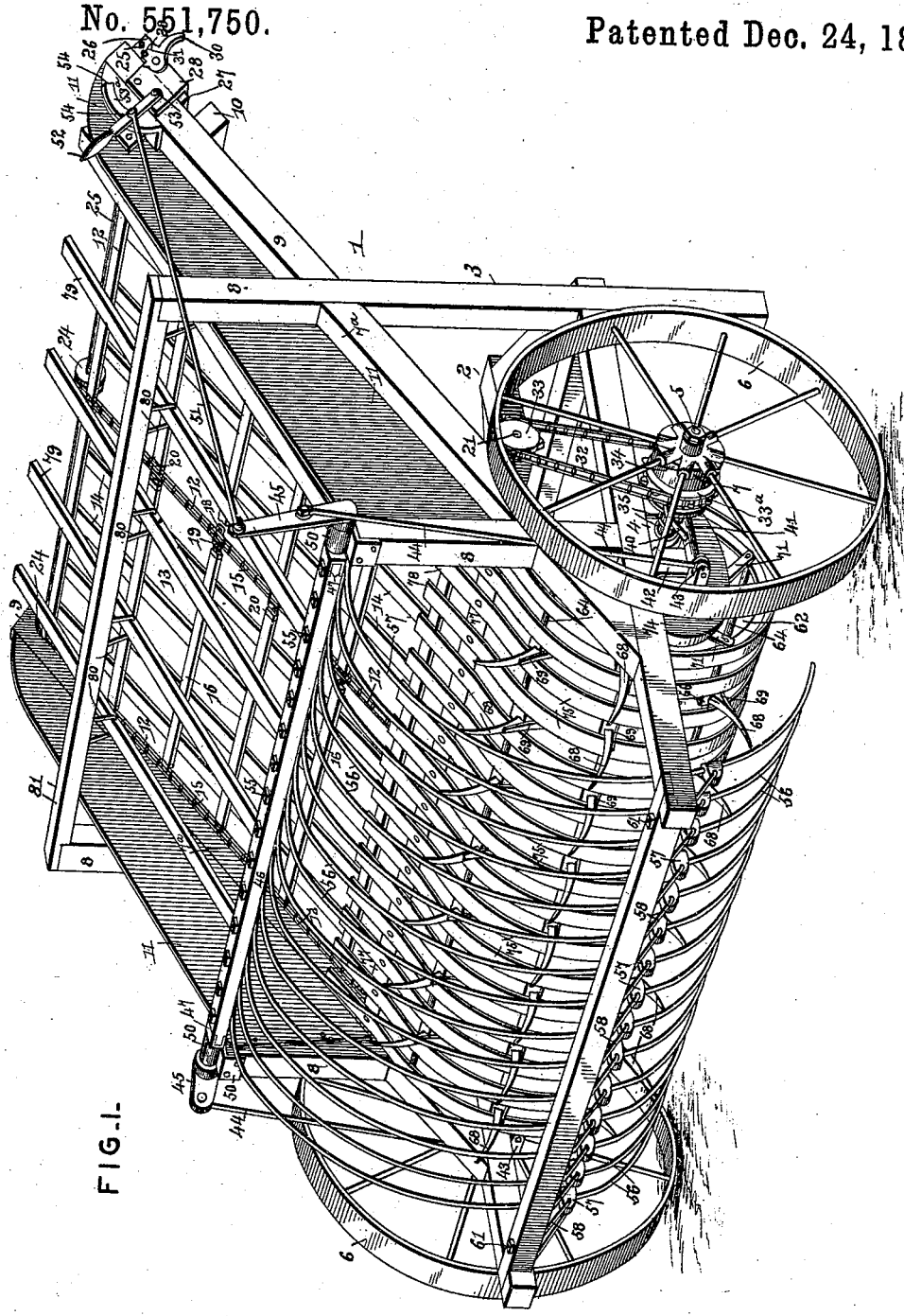

(No Model.) 3 Sheets—Sheet 3.
W. H. BECKWITH.
HAY RAKE AND LOADER.
No. 551,750. Patented Dec. 24, 1895.
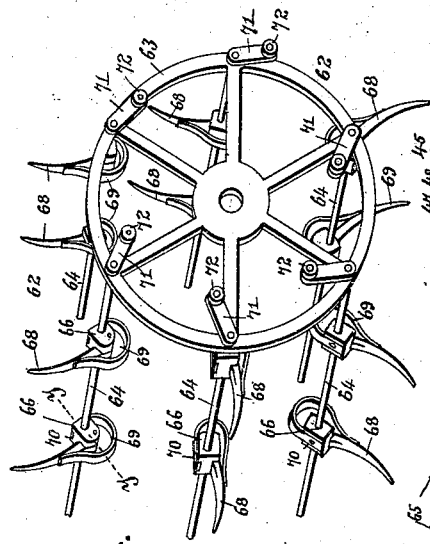
FIG. 4.
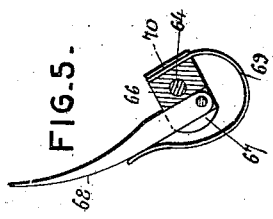
FIG. 5.
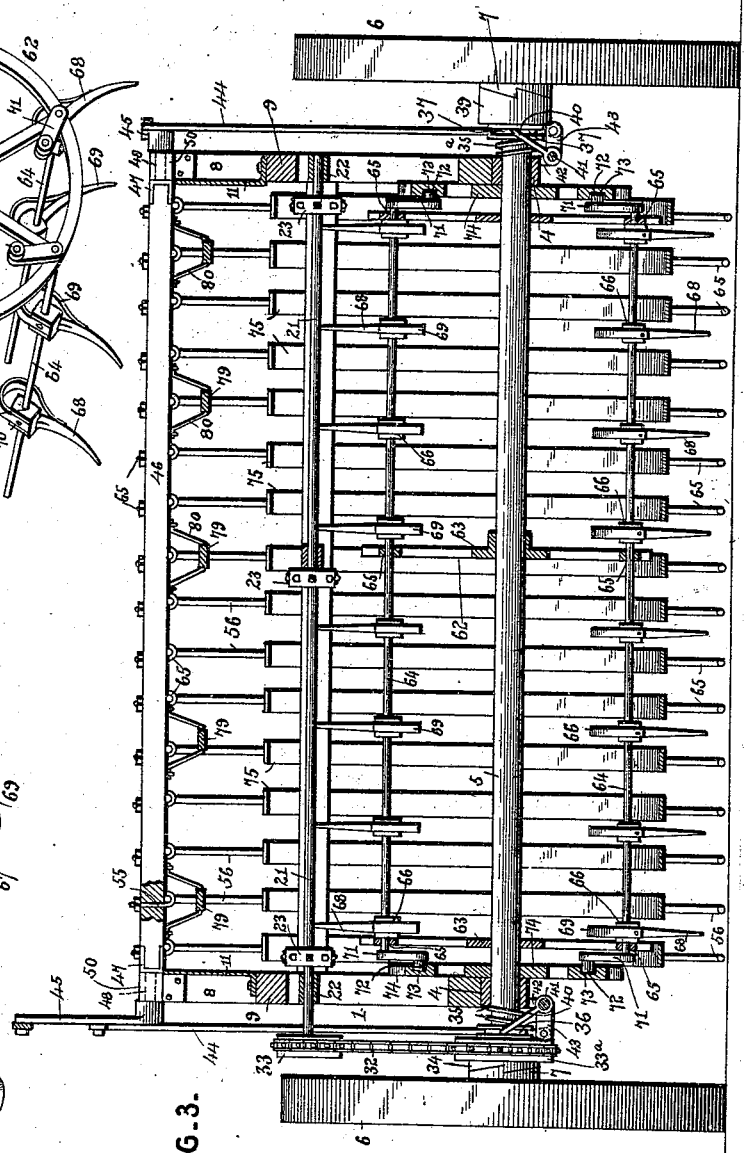
FIG. 3.
FIG. 7.
Witnesses
Jas. K. McCathran
L. P. Holhaupter
Inventor
William H. Beckwith
By his Attorneys.
C. A. Snow & Co.

UNITED STATES PATENT OFFICE.

WILLIAM H. BECKWITH, OF COKEVILLE, WYOMING.

HAY RAKE AND LOADER.

SPECIFICATION forming part of Letters Patent No. 551,750, dated December 24, 1895.

Application filed June 27, 1894. Serial No. 515,868. (No model.)

*To all whom it may concern:*

Be it known that I, WILLIAM H. BECKWITH, a citizen of the United States, residing at Cokeville, in the county of Uinta and State of Wyoming, have invented a new and useful Hay Rake and Loader, of which the following is a specification.

This invention relates to a combined hay rake and loader, and it has for its object to effect certain improvements in the raking part of machines of this character.

With this object in view the invention consists in the novel construction, combination and arrangement of parts hereinafter more fully described, illustrated and claimed.

In the accompanying drawings, Figure 1 is a perspective view of a combined hay rake and loader constructed in accordance with this invention. Fig. 2 is a central vertical longitudinal sectional view of the same. Fig. 3 is a transverse sectional view on the line $x$ $x$ of Fig. 2. Fig. 4 is a detail in perspective of a portion of the revolving picker-cylinder removed from the other parts of the machine. Fig. 5 is a detail sectional view on the line $y$ $y$ of Fig. 4. Fig. 6 is an enlarged detail in perspective of a portion of one of the carrier-chains. Fig. 7 is a detail in perspective of one of the yielding rake-tooth braces.

Referring to the accompanying drawings, 1 designates the main supporting-frame of the machine that is of a substantially rectangular shape, comprising opposite connected side and end bars, and extended from the front end of said frame is the ordinary tongue 2, to provide for connecting the machine with a hay-wagon in the ordinary manner, while at the front end of said frame are also located the usual foot-standards 3, that provide for supporting the machine on the ground when not connected with the wagon.

The main supporting-frame 1 is provided at opposite sides thereof with the opposite aligned bearing-boxes 4, in which is journaled the transverse axle-shaft 5, that supports on its opposite ends outside of the frame 1 the wheels 6, which are loosely mounted on said axle-shaft to provide for supporting the machine for travel on the ground, and also for turning the axle-shaft to communicate motion to the working parts of the machine in the manner to be presently described, and said loose wheels 6 are provided upon their inner sides with the clutch collars or faces 7, the function of which will be hereinafter referred to.

Suitably supported on and braced to the main wheel-supporting frame 1 is the inclined forwardly-extending carrier-frame $7^a$, which is principally supported in position by the supporting-uprights 8, that extend thereabove to form supports for other parts of the machine to be described, and said carrier-frame essentially comprises opposite side frame-bars 9, connected by a series of connecting cross-bars 10, and secured to the opposite side frame-bars of the inclined carrier-frame and extending thereabove are the supplemental inclosing-frame sides 11, that serve to confine the hay onto the endless carrier-apron 12, that travels within the carrier-frame over the carrier-platform 13, which platform preferably consists of a series of parallel longitudinally-arranged steel or wooden strips 14, that are suitably secured on the cross-bars 10 of the carrier-frame.

The endless carrier-apron 12 comprises opposite side and intermediate endless carrier-chains 15, that are of the ordinary drive-chain construction, consisting of interchangeable links and a series of parallel carrier-slats 16, connecting each opposite side chain with the intermediate chains. The opposite side carrier-chains are provided at regular intervals on the inside of certain links with the cast hook-eyes 17, that are adapted to align with similar eyes 18, cast on both sides of regularly-spaced links of the intermediate carrier-chain, and these hook-eyes of the said carrier-chains are adapted to be removably engaged by the engaging-hooks 19, at one end of the hook-clips 20, that are fitted onto both ends of the carrier-slats 16, and when the tension of these carrier-chains is relaxed the connection between the same and the slats may be disengaged, and when the carrier-chains are tightened up the hook-and-eye connection between the slats and the chains is also tightened and prevents the slats from unhooking from the chains.

The lower portion of the endless carrier-apron 12 is arranged to pass over the lower carrier-shaft 21, that is journaled in aligned bearing-boxes 22 at opposite under sides of the inclined carrier-frame at the lower end of the platform 13, and said lower carrier-shaft 21 has mounted thereon a series of sprocket or chain wheels 23, around which pass the lower portions of the endless carrier-chains 15, so that motion may be communicated to the carrier-apron, and upon one extremity of the lower carrier-shaft 21 is mounted an end sprocket or chain wheel 33, the function of which will be referred to. The upper portion or ends of the endless carrier-chains 15 of the carrier-apron 12 are arranged to pass over the grooved idler-wheels 24, that are mounted near the opposite ends and at an intermediate point on the upper carrier-shaft 25, the extremities of which are loosely journaled in the opposite adjustable bearing-boxes 26. The opposite adjustable bearing-boxes 26 are arranged to work under the opposite side frame-bars 9 at the upper ends thereof, and said bearing-boxes are provided at one side with the supporting arms or plates 27 and are arranged to slide in the supporting boxes or keepers 28, secured to opposite sides of the inclined carrier-frame at the upper end thereof. The said adjustable bearing-boxes are further provided at their outer sides with the beveled projected catch-studs 29, that are adapted to be engaged by the adjusting cam-levers 30. The adjusting cam-levers 30 are pivoted at one end to opposite sides of the frame 7ª, and are provided in their rounded cam-faces with a series of engaging notches 31, that are adapted to be engaged with the pointed side of the studs 29, so that the said boxes 26 will be held in any adjusted position to provide for maintaining the endless carrier-apron at the proper tension, so that the same will properly elevate or carry the hay.

Motion is communicated to the endless carrier-apron 12 by means of a short endless drive-chain 32, that passes around the sprocket or chain wheel 33, mounted on one end of the lower carrier-shaft 21, and said drive-chain derives its motion from the drive sprocket-wheel 33ª, that is feathered on one end of the axle-shaft 5 at one side of one of the ground-wheels 6. The sprocket-wheel 33ª is provided at one side with a clutch-face 34, that is adapted to be normally held in engagement with the clutch collar or face 7 of the ground-wheel at one side of the same by means of the spring 35, coiled on the axle-shaft 5 at one side of said sprocket-wheel, and at its side opposite the clutch-face 34 the said sprocket-wheel is provided with a grooved collar 36, corresponding to the grooved collar 37 at one side of the clutch-disk 39, that is splined on the opposite end of the axle-shaft, and is adapted to be normally held in engagement with the clutch collar or face of the opposite ground-wheel by the spring 35ª at one side thereof, so that means shall be provided for transmitting motion to the axle-shaft, and to the endless carrier-apron as the machine advances forward, while by reason of the beveled shoulders of the clutches at each end of the axle-shaft, comprising the members splined on the shaft and the clutch-collar of the wheels, the machine is allowed to readily turn corners or to be backed without interfering with the operation of the other working parts of the machine.

The grooved collars 36 and 37 of the opposite sliding-clutch members at one side of the loose ground-wheels are adapted to be loosely engaged by the opposite side portions of the U-shaped lever-yokes 40, that are mounted at an intermediate point on the short rock-shafts 41, journaled in the bearing-hangers 42, depending centrally from opposite sides of the wheeled supporting-frame 1, and said short rock-shafts 41 have connected to one end thereof the bifurcated shaft-arms 43, to which are pivotally connected the lower ends of the connecting-rods 44, the upper ends of which are pivotally attached to the rock-arms 45 at opposite ends of the oscillating rake-bar 46. The oscillating rake-bar 46 has attached to its opposite ends the U-shaped clamp-plates 47, that are extended into the pivot-spindles 48, from the extremities of which project the arms 45, and said pivot-spindles 48 turn in the bearing boxes 50, fitted on the upper end of the rear pair of frame-uprights 8, that are located at the lower end of the inclined carrier-frame. One of the rock-arms 45 of the oscillating rake-bar is longer than the other opposite arm and has attached to its extremity one end of the operating-rod 51, the other end of which is pivotally connected to an intermediate point of the adjusting-lever 52. The adjusting-lever 52 is pivoted at it its lower end at 53 to one side of the carrier-frame 7 near its upper end and is adapted to work at one side of the segment-plate 53ª, which is provided with the separated stop-shoulders 54, that are adapted to be engaged by the lever 52 to hold the machine in and out of gear.

The oscillating rake-bar 46 has secured to the under side thereof by means of the hook-bolts 55 the upper ends of the rear curved spring-wire rake-teeth 56, that are adapted to be adjusted down onto the ground by the lever 52, to provide for raking up the hay either from swath or windrow, and the said curved rake-teeth 56 are adapted to work in or through the yieldingly and loosely supported slide-collars 57. The slide-collars 57 are adapted to loosely receive the rake-teeth 56 in order to allow the same to be readily adjusted up and down, and also to yield to the natural spring or resiliency of the metal from which they are made, and said slide-collars are loosely or pivotally mounted at their lower ends or apices of the V-shaped brace-springs 58. The V-shaped brace-springs 58 are secured at their upper outer ends to the under side of the rear end bar of the wheeled supporting-frame 1, inside of which end bar the rake, consisting of the teeth 56, works, and said V-shaped brace-springs 58 are provided near their upper ends with the coiled spring-eyes 59, that are adapted to receive the transverse supporting-rod 60. The transverse supporting-rod 60 passes through the aligned coil-eyes of the entire series of springs 58 and is secured to the rear end bar of the wheeled supporting-frame by means of the hook-bolts 61, and it will therefore be seen that the coiled-spring eyes not only add to the spring of the brace-springs 58, but provide means for supporting them in position.

The V-shaped brace-springs 58, together with the slide-collars loosely carried thereby, comprise yielding rake-tooth braces, which while allowing the rake to be adjusted up and down at the same time allow each rake-tooth to independently clear obstructions and then force the tooth back into position when the obstruction is passed, and also create an extra draft to allow bunched hay to pass through freely without clogging the machine. By this construction and arrangement it will also be obvious that the shape of the rake is better preserved and the same may be adjusted more properly to a working position, and at this point it is to be observed that when the rake is lifted off of the ground by the lever 52 the connections 45, 44, and 41 disengage the sliding-clutch members from the ground-wheels, so as to throw the other working parts of the machine out of gear, thereby avoiding the delay and necessity of stopping the wagon to allow a man to get down to throw the machine in and out of gear in moving the same from place to place.

Mounted on the axle-shaft 5, so as to turn therewith, is the revolving picker-cylinder 62. The revolving picker-cylinder comprises a series of spider cylinder-heads 63, mounted fast on the axle-shaft 5, and connected by a circumferential series of oscillating picker rods or shafts 64. The oscillating picker rods or shafts 64 are mounted to turn loosely in the bearing-openings 65, formed in the circular spider cylinder-heads 63, and arranged longitudinally on each of the oscillating rods or shafts 64 are a series of tooth blocks or collars 66. The tooth blocks or collars 66 are made fast on the oscillating rods or shafts and alternate with the blocks or collars on the adjacent rods or shafts, and said tooth blocks or collars are provided at one side with the recesses 67, in which are pivoted one end of the pointed picker teeth or fingers 68, the other ends of which are pointed, and said teeth or fingers 68 are normally held against said blocks or collars beyond their pivots by means of the leaf-springs 69, one end of which springs are received and made fast in the spring-receiving grooves 70, formed in one side of the said blocks or collars, thereby leaving the other ends of the springs free to rest against one side of the picker teeth or fingers 68.

The opposite extremities of the oscillating picker rods or shafts 68 extend beyond the opposite end cylinder-heads and have connected thereto one end of the short lever-arms 71, on the other ends of which lever-arms are loosely mounted the rollers 72, that loosely travel in the cam-grooves 73 formed in the inner sides of the stationary cam heads or castings 74, mounted at opposite inner sides of the wheeled supporting-frame $l$. The cam-grooves 73 of the cam heads or castings 74 are elliptical in shape, so as to provide for disposing the short lever-arms at the ends of the picker rods or shafts 64 in a position that will draw the picker teeth or fingers inward, so as to clear themselves from the hay just before it passes onto the lower end of the endless carrier-apron 12. When the axle-shaft is in gear with the ground-wheel the picker-cylinder is caused to revolve and the projecting picker teeth or fingers pick or gather the hay from the rake and deliver it onto the apron 12, and by reason of the means for rocking the rods or shafts carrying said teeth the latter are withdrawn from the hay so as to clear the framework at the lower end of the carrier, and are prevented from dragging the hay below the carrier.

The revolving picker-cylinder 62 is loosely embraced at the rear, top, and bottom sides thereof by a series of circular fender-bands 75. The circular fender-bands 75 might be properly said to form a slotted casing for the cylinder, and may be formed of either wood or steel. The said circular bands 75 are regularly spaced from each other to admit of the passage of the picker teeth or fingers 68 therebetween, and the lower front ends of the said bands are attached to the frame cross-bar 76, connecting the opposite side bars of the frame 1 in front of the axle-shaft, and the upper ends of the said bands above the picker-cylinder are attached to the upper frame cross-bar 77, connecting the opposite side frame-bars of the carrier-frame adjacent to the lower end of the endless carrier-apron 12, and the said bands 75 are extended beyond the bar 77 to form bridge portions 78, that bridge the space between said bar and the lower end of the carrier-apron to prevent the hay from falling through such space. The said bands not only serve to prevent the hay from clogging the picker-cylinder, but also act in the capacity of guides to convey the hay around the cylinder and onto the carrier.

Arranged over the endless carrier-apron 12 are a series of parallel longitudinally-disposed retaining-bars 79, that serve to hold the hay onto the carrier while being elevated onto the wagon, and said retaining-bars 79 are loosely supported in position by means of the V-shaped hanging wires 80. The V-shaped hanging wires 80 are loosely connected at one end to the lower ends and to an intermediate point of the said bars, and the lower set of hanging wires are pivotally attached at their upper ends to the rake-bar 46, and the intermediate set of such wires are loosely suspended from the top cross-bar 81, connecting the upper ends of the front pair of supporting-uprights 8.

Changes in the form, proportion, and the minor details of construction may be resorted to without departing from the principle or sacrificing any of the advantages of this invention.

Having thus described the invention, what is claimed, and desired to be secured by Letters Patent, is—

1. In a combined hay rake and loader, the combination with the wheeled supporting frame and the inclined carrier thereon; of the rear adjustable rake adjustably supported at the rear lower end of the carrier, and a series of V-shaped spring rake-tooth braces secured at the rear end of the main supporting frame and having self adjusting loose slide collars loosely receiving the rake teeth of the rake, substantially as set forth.

2. In a combined hay rake and loader, the combination with the wheeled supporting frame and the inclined carrier thereon; of the rear adjustable rake supported at the rear lower end of the carrier and having its teeth working within the rear end of the main supporting frame, a series of V-shaped brace springs secured at their upper ends to the rear frame bar of the main supporting frame and provided near such ends with coiled eyes, a supporting rod passed through the aligned coiled eyes of said brace spring, and secured to the rear end of the main supporting frame, and slide collars loosely connected to the lower ends of said V-shaped springs and loosely receiving the rake teeth, substantially as set forth.

In testimony that I claim the foregoing as my own I have hereto affixed my signature in the presence of two witnesses.

WILLIAM H. BECKWITH.

Witnesses:
WILLIAM LAUDER,
ASAHEL C. BECKWITH.